Figure 1:
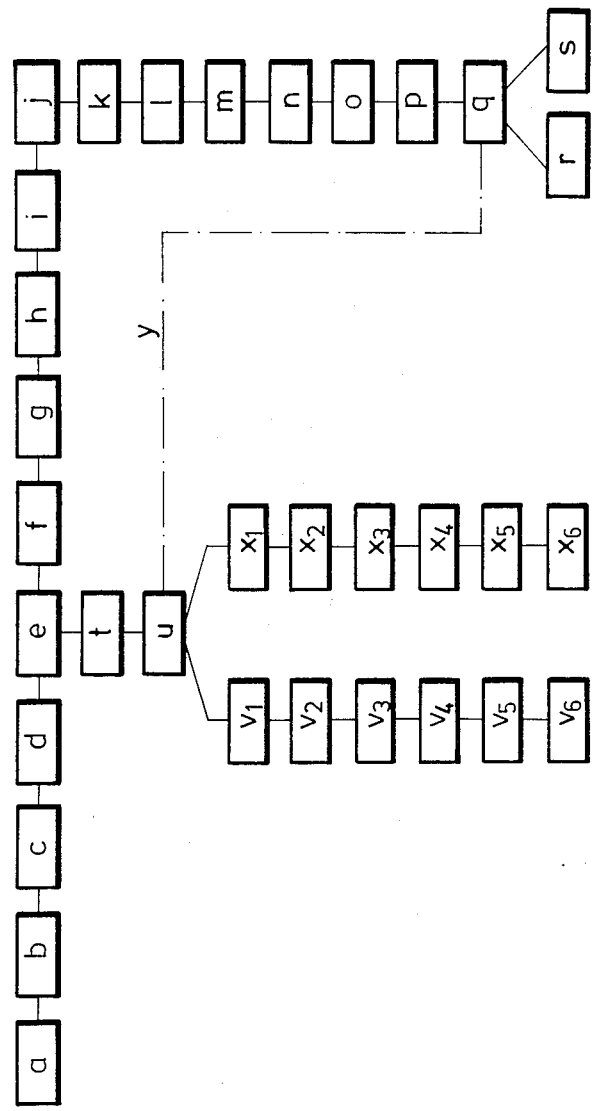

United States Patent [19]

Bátorfalvi et al.

[11] Patent Number: 4,617,700
[45] Date of Patent: Oct. 21, 1986

[54] PROCESS AND APPARATUS FOR THE HYGIENIC EXTRACTION AND COLLECTION OF ANIMAL BLOOD FIT AND UNFIT FOR HUMAN CONSUMPTION

[75] Inventors: Géza Bátorfalvi, Budapest; Tibor Lendvai, Baja; Antal Rádai, Baja; Gáborné Pongrác, Baja; Miklós Szabó; Jenö Szilárdi, both of Budapest, all of Hungary

[73] Assignees: Országos Husipari Kutatóintézet, Budapest; Bácskai Husipari Közös Vállalat, Baja, both of Hungary

[21] Appl. No.: 583,506

[22] Filed: Feb. 24, 1984

[30] Foreign Application Priority Data

Mar. 14, 1983 [HU] Hungary ................. 853/83

[51] Int. Cl.$^4$ ................................. A22B 3/00
[52] U.S. Cl. ........................... 17/45; 17/1 C; 17/24
[58] Field of Search ................. 17/1 C, 24, 45

[56] References Cited

U.S. PATENT DOCUMENTS

| | | | |
|---|---|---|---|
| 3,292,205 | 12/1966 | Rizzi | 17/1 C |
| 3,649,996 | 3/1972 | Marti | 17/1 C |
| 3,857,137 | 12/1974 | Bond | 17/1 C |
| 3,947,919 | 4/1976 | Ekdahl | 17/1 C |
| 4,090,275 | 5/1978 | Jorgensen et al. | 17/24 |
| 4,092,762 | 6/1978 | Ochylski | 17/45 |
| 4,270,241 | 6/1981 | Braga | 17/1 C |

Primary Examiner—E. R. Kazenske
Assistant Examiner—W. Fridie
Attorney, Agent, or Firm—Gabriel P. Katona

[57] ABSTRACT

A process for the hygienic extraction and separate collection of animal blood fit and unfit for consumption, comprises stunning the animals prior to stabbing and providing the animals with serial numbers suitable for identification of the carcass and the blood to be extracted. The spot of stabbing on the throat of the animals is disinfected and the animals are cyclically stepped into a stabbing position. The animal is stabbed in the stabbing position with a disinfected stabbing tool which is exchanged for each animal and is provided with a closed outlet a hose-fitted hollow knife. The hygenic blood is extracted through the stabbing tool into one of a plurality of rotating blood collecting tanks arranged on a turntable and moved into an extracting position. An anticoagulant is added to the blood by gravity feed and after filling, the tanks are advanced toward into a first draining position for blood fit for consumption. If all the numbered carcasses pertinent to the blood in the tank in the first drawing position are held impeccable from the point of view of animal healthy examination, a control body effects the draining the blood from the collecting tank into a system for blood fit for consumption. If not impeccable, the tank is advanced with the blood in it forward to a second draining position and drained into a system for blood unfit for consumption. The drained tanks are washed and disinfected and advanced into the extracting position.

8 Claims, 11 Drawing Figures

PROCESS AND APPARATUS FOR THE HYGIENIC EXTRACTION AND COLLECTION OF ANIMAL BLOOD FIT AND UNFIT FOR HUMAN CONSUMPTION

The subject of the invention is a process and apparatus for the extraction and collection of the blood mainly of pigs, cattles, sheep, whereby the blood fit for consumption can be safely separated from the extracted animal blood, and the process and apparatus ensure the extraction of the maximal amount of animal blood as well as its hygienic, aseptic recovery for the purpose of consumption.

The animal blood is a raw material with high protein content (blood of pig: 18.5%), recoverable in large quantity, containing valuable biological components in respect of alimentation.

During the initial phase of slaughtering the animal blood is recovered in infectious environment. According to the hygienic specifications of several countries the animal blood has to be examined in respect of consumption, and the identification of the carcass and its extracted other parts has to be ensured until the final examination position. Such specifications are in force in Hungary and in the Federal Republic of Germany as well. In the latter country an article containing the specifications in force was published in the periodical "Fleischwirtschaft" on the Oct. 10th 1981, page 1460–1464 from the author Grätz.

In case of the traditional blood extraction the pig is stabbed approximately in the centre of the chaps. The stabbing cuts the main artery and the blood flows freely out of the animal body. If the blood is intended for further processing, then instead of the conventional flat knife a hollow knife is used for stabbing with a hose fitted onto the end of the knife, through which the blood flows into a can. The can is stored at the place of blood extraction until the decision of the examining body is received. Since the carcasses are marked not on the occassion of stabbing but at a later stage, the identification is not ensured and consequently the danger of infection is high.

The ALFA-LAVAL-VAMPIR system represents a more advanced process in relation to the traditional blood extraction (summary of the literature published by KGM TMTI on the Spet. 15th 1977). In this process the anticoagulant is admitted into the hollow knife, the suction of the blood is assisted by vacuum, the washing and disinfecting liquid is conducted into a certain part of the system. The washing and disinfection of the hollow knife in order to prevent the spread of infection and the identification are not solved. The identification is based on the sequence of stabbing the animal on the slaughter line and on its arrival at the final animal hygienic control station.

Prior to scalding and scraping however the animal can get mixed up, the sequence can be changed, in which case the carcass can not be identified against the blood of the animal. A further fault of the system is that it collects the blood of many animals into the tank still before the decision is received, thus the blood of several hundred animals will be confiscated on account of a single diseased animal. Another fault of this method is that the blood is forwarded for storage in cooled condition, consequently the separation of the blood is difficult, because the optimal temperature for the separation is 30°-40° C. (according to the data of the machine manual of the Soviet separator SZKI as confirmed by the results of other analyeses too). Further drawback is that the knife used in the system is a multiblade knife which can be disassembled, as a result of which partly it causes an extensive wound, and partly the cleaning of the knife is difficult because of the large and multiple surfaces. The quantity of the blood extracted for consumption is only 2.2-2.5% of the carcass weight according to this system.

The BEMEG-Industrielplanung apparatus represented a definite progress in this respect. This apparatus consists of a turntable with twelve knifes fitted with a hose. The turntable moves with the pigs on a circular track, the blood flows through the hollow knife into the tank receiving the blood of 40 animals, where it is held until the animal hygienic decision arrives. In this apparatus the knife and the hose are washed but with inadequate efficiency. The drawback of this method is that the identification of the carcass is not solved, because it is based on the preservation of the sequence. The risk factor of the process is high, because a single rejected animal may cause the confiscation of the blood of 40 animals. The knife is similar to the VAMPIR knife, thus this too is unfavourable. The quantity of the extracted blood is the same as that of the blood recovered according to the VAMPIR method.

A more advanced solution is offered by the Swiss firm RINEKER. In this method the washing of the knife is the same as that of the BEMEG type knife. The risk factor of the process is low, because the blood of only 5 animals are collected into one vessel. The disadvantage of the process is, that the blood is cooled before separation, the anticoagulant is pressed into the knife by a pump, which is disadvantageous on account of clogging, furthermore the identification is not solved either and the costs of the apparatus are high. The knife can be disassembled, thus its disinfection is difficult and the amount of the recovered blood is not higher than 2.5%.

The most up-to-date apparatus is that of the Danish firm NUTRIDAN Co. The blood and the carcass are identified with mechanical co-ordination with the aid of the coded overhead cars, consequently the vertical scalding and scraping are conditions of the applicability of the apparatus. This apparatus is used only at few places. Its drawback is that owing to its high capacity it extracts the blood with two knives at the same time, which causes trouble in case of complications arising at the boundary of the groups, because the group of the confiscated blood can not be determined. Further fault is that the risk factor is high because the blood of 5 animals are collected in one vessel. The disassembly of the knife is another disadvantage. The quantity of the extracted blood is around 2.5-2.8%.

The process and the apparatus according to the invention eliminates the shortcomings of the known solutions, which enables the hygienic recovery of a greater amount of blood fit for consumption—with the use of a suitably formed hollow knife—with the application of a safer identification method and at a lower risk factor than the methods used so far and by collection of the extracted blood at the original temperature it facilitates the separation of the stored blood.

The primary purpose of the invention is the hygienic realization of a large amount of blood extraction fit for consumption with the apparatuses, control devices and system of the mechanical operations necessary for this purpose. Its secondary purpose is the collection of blood unfit for consumption.

The invention ensures the safe identification of the blood and the animal body without the possibility of mix-up. It realizes the washing and disinfection, in the process of which all elements in contact with the blood will be washed and disinfected before they are used again. This way the further infection of the carcasses and the blood collected for consumption is prevented by the invention. The blood is collected in optimal quantity and in suitable assortment, thus its risk factor is low, while the economic efficiency is preserved. The blood collected for consumption flows from the collecting tank through a separate pipe system into the storage tank. The blood collected for consumption passes at suitably high temperature of 32°–34° C. into the storage tank and it will be cooled only after separation. The invention prevents the blood from foaming with the more intensive use of vacuum. The closed system, the suitably formed elements and units prevent stagnation of the blood and facilitate the washing and disinfection of the whole apparatus.

The invention ensures the extraction of the maximum amount of blood, preferably 3.7%, whereby the user obtains more basic material and the risk of decomposition of the carcass drained from blood is reduced, since the blood as one of the most perishable substances is removed from the organism of the animal in its totality as far as possible. The separation of the blood for consumption is safely realized by the invention through the final animal hygienic control station. The invention allows the summary of various indices (output, trichinella, group number, blood extraction number) and thereby the saving of labour force.

With the aid of the process and apparatus according to the invention the blood extraction and collection from the animals of different variety, sex and age are realized more favourably and in compliance with the hygienic specifications of the developed countries in such a manner that about 90% of the total stock of blood of the healthy animals is utilized for consumption and only 10% is used for industrial purpose. The invention ensures that the total amount of blood unfit for human consumption, or the blood of the suspected animals passes into the blood-collecting system for industrial purpose.

The technical effect of the invention in respect of the main process of the slaughterhouse begins on the slaughterline with driving the animal into the traditional stunning box and following the blood extraction it continues through handing over onto the after-bleeding section until the switch-over onto the track of suspected animals following the final animal hygienic control body.

In the blood extraction process taking place on the slaughterline the invention includes the apparatuses used for providing the carcasses with serial numbers, for sterile stabbing, collection, examination, classification and transport of the blood used both for consumption and for industrial purpose. The process of blood extraction and collection in case of the blood used for consumption takes place until the separator tank and in case of the industrial blood until the collecting tank. The complete washing and disinfecting sub-system which is suitable for the washing and disinfection of all apparatuses in contact with the blood used for consumption and for industrial purpose is a part of the invention.

Further part of the invention is the guiding and control sub-system, suitably an electro-pneumatic system, which controls the complete process, especially the timed slaughtering, the identification of the carcass against the extracted blood, the frequency of the washing and disinfection process of different length of time and the separation of the blood used for consumption and for industrial purpose.

The process according to the invention is based on the recognition that the extraction and collection of the animal blood—mainly that of the pig, cattle and sheep—fit for consumption can be most favourably realized in compliance with the hygienic requirements and with the safe recovery of the maximum amount of blood, preferably 3.7%, fit for consumption at minimal loss, if the blood extraction from the animal to the storage tank is carried out suitably in a closed system, and all apparatuses in contact with the blood are continuously cleaned and disinfected prior to and after the blood extraction, the blood giving animals are marked before the blood extraction for identification by the animal hygienic control body against the blood in the tanks rotating on the turntable, whereby the control body is capable to determine without any doubt the tank containing the blood fit or unfit for consumption and accordingly to instruct the turntable for discharging the blood fit or unfit for consumption into the suitable collecting system. The invention idea includes the apparatus for realization of the process according to the invention, which is provided with a specially formed hollow knife fitted with a hose—previously disinfected inside-outside, preferably in a washing-disinfecting apparatus—used for forwarding the blood into the blood collecting tanks arranged on the turntable, the collecting tanks are forwarded with the turntable co-ordinated according to the rate of progress of the carcasses, the animal hygienic control body identifies the carcasses against the blood collected in the tanks and depending on the result of the examination it gives instruction through the control system for the discharge of the blood fit for consumption into the storage system or of the blood unfit for consumption into the blood collecting system. Furthermore the discharged blood collecting tanks on the turntable are made suitable for the sterile reception of the blood by a suitably formed washing unit. The use of a sterile hollow knife fitted with hose for the blood extraction of each animal is ensured by a suitably formed washing apparatus carrying out the washing and disinfection of the hollow knife.

In the process according to the invention aimed at the hygienic extraction and collection of the blood fit and unfit for consumption the animals stunned prior to stabbing (blood extraction) are provided with serial numbers suitable for identification of the carcass and the blood to be extracted, the spot of stabbing on the throat of the animals is disinfected, then following the cyclic stepping of the animals into the stabbing position the stabbing (blood extraction) is carried out with a disinfected stabbing tool provided with a closed outlet and exchanged for each animal, suitably with a hose-fitted hollow knife, the hygienic blood extraction into the intermittently rotatable blood collecting tanks arranged on a turntable is carried out through the stabbing tool provided with a closed outlet, preferably with the use of a conventional anticoagulant, and for the accelerated recovery of the maximal amount of blood with the use of a conventional vacuum in such a way that the blood of maximum ten pigs, or sheep and in case of cattle the blood preferably of three animals is extracted and collected into the successive blood collecting tank stepped into the blood extracting position, upon completion of the filling the uniformly spaced tanks rotated preferably upon a light and/or sound signal are stepped forward into the next position, when another disinfected empty tank is stepped into the blood extracting position, the filling of which takes place as described earlier, while the tank or tanks filled with blood step forward until the animals drained from blood arrive on the slaughterline at the animal hygienic control body for identification against the blood in the tank standing in the draining position of the blood fit for consumption, then if all carcasses pertinent to this blood are held impeccable from the point of view of animal healthy examination the control body gives instruction through the control units for draining of the blood from the collecting tank into the system of the blood fit for consumption to be carried out by an intervention device, in case of an object the tank with the blood in it is stepped forward and drained into the system of the blood unfit for consumption, then the drained tanks are washed and disinfected and by stepping the disinfected empty tank into the blood extracting position the process of blood extraction, collection and separation to blood fit and unfit for consumption is repeated under hygienic conditions.

FIG. 1 illustrates the technological process of a pig slaughterline given by way of example, in which the carcass handling technological steps a–s are the sequence of conventional operations, while the operations marked as t–u–y, $v_1$–$v_3$ and $x_1$–$x_3$, associated with the hygienic blood extraction in closed system and with the collection, examination and separation of the blood, are parts of the blood extraction process according to the invention.

The operations of the technological process according to FIG. 1 are the following:

a—stunning
b—strapping
c—lifting onto the track
d—positioning, serial numbering, disinfection of the spot of stabbing
e—stabbing (blood extraction)
f—after-bleeding
g—washing of the carcass
h—removal of the staps
i—scalding
j—scraping
k—lifting onto the track
l—mechanical cleaning
m—manual cleaning
n—carcass washing
o—opening (removal of intestine)
p—splitting
q—animal hygienic examination to determine the fit condition for consumption of the pig
r—cooling
s—examination of the suspected meat The hygienic blood treatment technology suitably in closed system connected with the operation of stabbing (blood extraction) is the following:

t—washing and disinfection of the hose-fitted hollow knife inside-outside prior to the stabbing (blood extraction)
u—conduction of the blood extracted from each group of animals (e.g. 10 pigs) into the blood collecting tanks rotated on the turntable
y—determination of the fitness of the extracted blood for consumption based on the animal hygienic examination q, followed by instruction for separation of the blood fit and unfit for consumption
$v_1$—draining of the blood fit for consumption from the tank containing impeccable blood
$v_2$—conduction of the blood fit for consumption through a heat-insulated pipe
$v_3$—storage of the blood fit for consumption in a closed pre-storage tank
$v_4$—pipe of the blood fit for consumption
$v_5$—separator
$v_6$—pump
$x_1$—draining of the blood unfit for consumption
$x_2$—conduction of the blood unfit for consumption
$x_3$—storage of the blood unfit for consumption in a collecting tank
$x_4$—blow-tank for the blood unfit for consumption
$x_5$—blow-pipe
$x_6$—central waste collecting bin The process according to the invention is demonstrated with the following examples:

EXAMPLE 1

In order to prevent congestion of the pigs arriving at the rate of ten on the maximum 100 pc/h capacity slaughterline (shown in FIG. 2) the rate of arrival is controlled with signals emitted by the push plates of the conveyor, which light signals ensure the cyclic stunning in the position of stunning. Following the strapping of the hind legs, the pigs arrive suspended on the hind legs at the overhead track in the waiting-feeding position.

Here the suspended waiting pigs are provided with a serial number preferably with the use of a semi-automatic tool according to the signal given by a central control unit, followed with the disinfection of the spot of stabbing on the throat with the aid of a suitably formed brush.

The stabbing part of the hose-fitted hollow knife previously washed and disinfected inside-outside is stabbed into the disinfected throat of the pig forwarded to the stabbing position by the feeding mechanism so, that the blood of the pig flows only through the hollow knife and through the hose fitted to it into the next previously washed and disinfected blood collecting tank arranged on the turntable. Thus the blood from the pig flows in a closed system, in contact with the previously washed and disinfected apparatuses (hollow knife, hose, tank) into the rotatably stepped tank arranged on the turntable.

The blood extraction is assisted by a vacuum, while the coagulation of the blood is prevented by adding a coagulant to the outflowing blood.

The bleeding of the pig is indicated by a sound signal upon which the hose-fitted hollow knife is removed, one end i.e. the stabbing part of the knife is removed from the wound, the other end i.e. the hose end is removed from the tank, and it is placed into the washing-disinfecting apparatus. The pig is forwarded by a conveyor into an after-bleeder. The blood of the next pig arriving at the stabbing position is extracted as described before with another washed and disinfected hollow knife and drained into the blood collecting tank.

According to the example ten blood collecting tanks are uniformly spaced along the periphery of the turntable and the blood of the successive ten pigs is drained into each tank. The serial number of the pig arriving for blood extraction is indicated by a board in the stabbing position.

When the draining of the blood of the tenth pig into the collecting tank is indicated preferably by light and/or sound signal, the hose-fitted hollow knife is removed and the turntable with the filled up tank—provided suitably with automatically closing orifice—turns one position further, at an angular displacement of 36° according to the example, and the next washed and disinfected empty tank is stepped to the blood extracting position A. Its filling with blood of the next ten pigs takes place as described before.

The turntable and the rotation of the tank are coordinated with the progress of the pigs drained from blood on the slaughterline so that when the tank filled with blood after the blood extraction makes the fifth step following the four waiting positions B, C, D, E, i.e. when it turns at 180° in relation to the blood extracting position A, in this sixth draining position F of the tank of blood fit for consumption all the ten pigs passed by the animal hygienic control body, the blood of which is collected in this tank. This is checked by the animal hygienic control body in such a way that the sign board at this place shows the consecutive serial numbers of the pigs arriving at the animal hygienic control body.

When the animal hygienic control body qualifies the blood of the ten pigs in the tank in the blood draining position F fit for consumption, it gives permission through the central control unit for draining of the blood in the tank into the system storing or processing the blood fit for consumption. In the interest of proper separation of the blood plasma and the thick blood the blood is conducted at high temperature of 32°-34° C. with a special pump. If any of the mentioned ten pigs is suspected or found as unsuitable in respect of consumption and are to be confiscated furthermore if all the ten pigs do not arrive at the control body e.g. one of them falls off the conveyor, then the animal hygienic control body prohibits the draining of the blood into the system of the blood fit for consumption, and the tank filled with blood is stepped forward into the seventh position suitably into the waiting position G, then it is stepped forward into the draining position H of the blood unfit for consumption. According to the example this is the eight position being at an angular displacement of 252° from the blood extraction position A.

In this position H, according to the example, each tank is regulated for draining either it arrives in empty condition (the blood fit for consumption is already drained off), or filled with blood unfit for consumption.

The tank already drained off arrives empty at the next nineth position I at an angular displacement of 288° from the blood extracting position A. Here the tank is washed and disinfected.

The tank stepped into the tenth position J at an angular displacement of 324° from the blood extraction position A discharges the cleaning liquid. In this dripping position J the tank is prepared for the next blood extraction cycle by attachment of the disinfected hoses (hose of the hollow knife, vacuum hose and anticoagulant hose).

Now the tank turns into the first blood extracting position A where the blood extraction is repeated according to the described method under completely hygienic conditions with disinfected apparatuses, in closed system, and the ten position cycle of the blood collection and separation is realized by the 360° turn of the turntable.

The animal hygienic control body identifies the blood of the ten pigs representing the content of the tank in the blood draining position F against the examined carcasses according to the label in the ear of the pigs and the serial number on the sign board of the control body.

Should a pig found in the group of ten that is suspected and to be confiscated, the animal hygienic control body prohibits through the control line the draining of the content of the tank in the position F into the blood collecting system and the rejected carcass is directed to the track section of the suspected animals.

When the animal is exchanged (e.g. fell down) on the slaughterline between the blood extraction position and the animal hygienic control body, if the animal is not put back onto its original position, the indicating counter is advanced at the control station, but the blood of the group of ten animals in question must not be drained into the system of the blood fit for consumption.

EXAMPLE 2

In case of blood extraction from cattles—disregarding the comparison between the cattle and pig slaughterlines—the process of blood extraction and collection according to the invention differs from the process described in Example 1, in that the blood of three cattles is collected into each tank and the tank is forwarded from the blood extracting position A to the next position after the blood is extracted from three cattles. In this process suitably eleven tanks are arranged along the periphery of the turntable, and accordingly the tanks are stepped into eleven positions during one cycle. The number of positions is increased suitably at the waiting positions following the blood extracting position A. Otherwise the process (i.e. the blood extraction, draining of the blood fit for consumption and the operational steps following thereafter such as the washing and disinfection) are the same as those described in Example 1.

The apparatus used for realization of the process according to the invention aimed at the hygienic extraction and collection of the blood fit and unfit for consumption has an intermittently rotated turntable provided with stepping mechanism and control units, a central control unit and a controlled regulating system, furthermore it is provided with a numbering machine for identification of the carcass and its blood, a hose-fitted hollow knife with a ribbed stabbing part made of a single piece leading into a tank standing on the turntable in blood extracting position, tanks uniformly spaced along the periphery of the turntable and to be drained through a hose cock arranged on the conical lower part of the tank, while its conical upper part is connected with couplings to the hollow knife to a vacuum tube and to a hose for the anticoagulent, a storage system for the blood fit for consumption connected to the hose cock on the bottom of the tank being in blood extracting position on the turntable, a collecting system for the blood unfit for consumption connected to the hose cock on the bottom of the tank being in draining position of the blood unfit for consumption, a tank-washing unit arranged preferably above the tank in the washing-disinfecting position, a knife washing apparatus for washing and disinfection of the hollow knife fitted with a hose and a conventional intervention device for opening—then closing after draining—the hose cock of the tank being in draining position of the blood fit for consumption upon the instruction of the animal hygienic control body, and with conventional control devices for opening the hose cock of the tank being in the draining position of the blood unfit for consumption following the washing and disinfecting position.

The invention includes a hose-fitted hollow knife for extraction of the blood, the stabbing part of which made of a single piece is provided with a flat blade, with longitudinal ribs preferably perpendicular to the blade, with longitudinal slots, with a lower tube part and a surrounding flange, furthermore with a sleeve and a hose releasably fitted to the lower tube part and with an inlet stub provided with a plug at the end of the hose. The washing unit used for washing the blood collecting tank is also a part of the invention, which consists of a spherical washing head provided with holes, furthermore of a device moving alternately the washing head in vertical direction, as well as a device fitting a conical element into the mouthpiece of the tank and of conventional limit switches for controlling the actuators, suitably conventional pneumatic cylinders. A further part of the invention is a washing apparatus for the hose-fitted hollow knife used for the extraction of the animal blood. The washing apparatus is fixed to a stand and has an upper and lower tube provided with nozzles emitting a washing agent and a disinfectant into the inside of the apparatus. The upper tub has a disinfectant admitting pipe stub fitted to the hollow knife plug clamping element for disinfection of the interior of the hose-fitted hollow knife, a pipe stub admitting the liquid for disinfection of the external part of the hollow knife, nozzles and an inlet orifice at the bottom provided with an instant clamp. The lower tub has a tilting cover with conventional limit switches for the automatic control of the washing programme, a frame clamping the stabbing part of the hollow knife and a water draining funnel provided with a pipe for the discharge of the liquid into the sewage system.

The apparatus for the hygienic blood extraction and collection according to the invention is shown schematically in the following diagrams by way of example only in a pig slaughterline.

Figure 2:
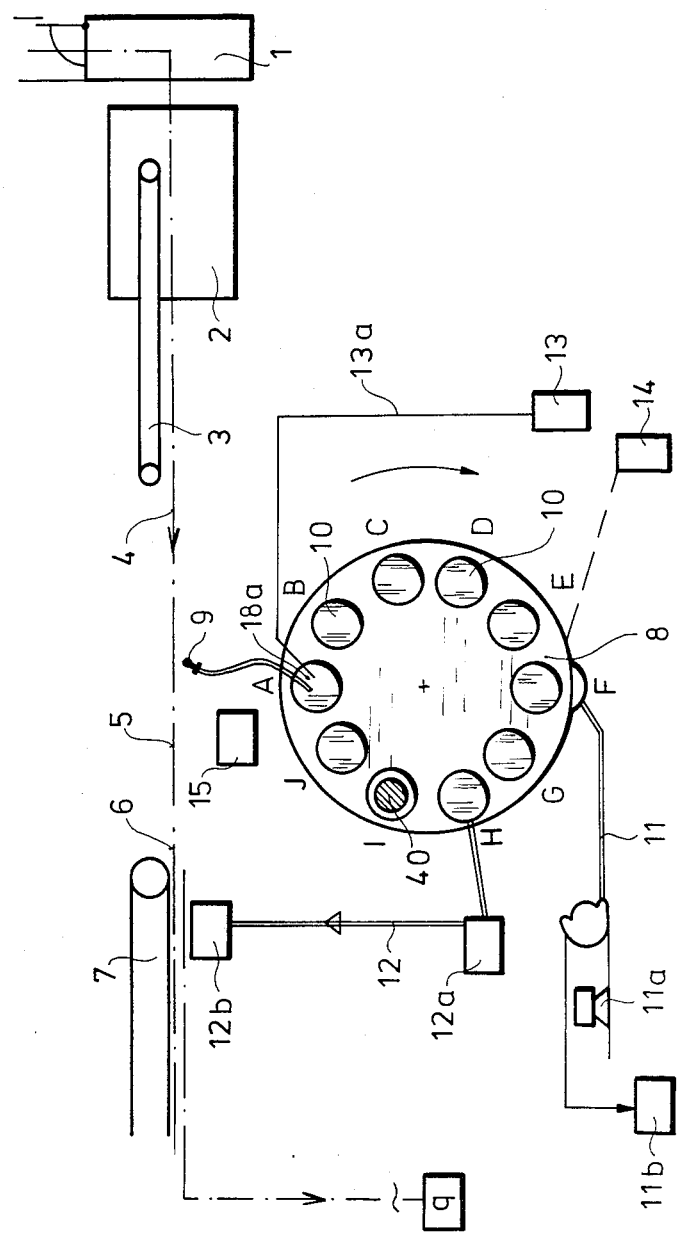
Figure 3:
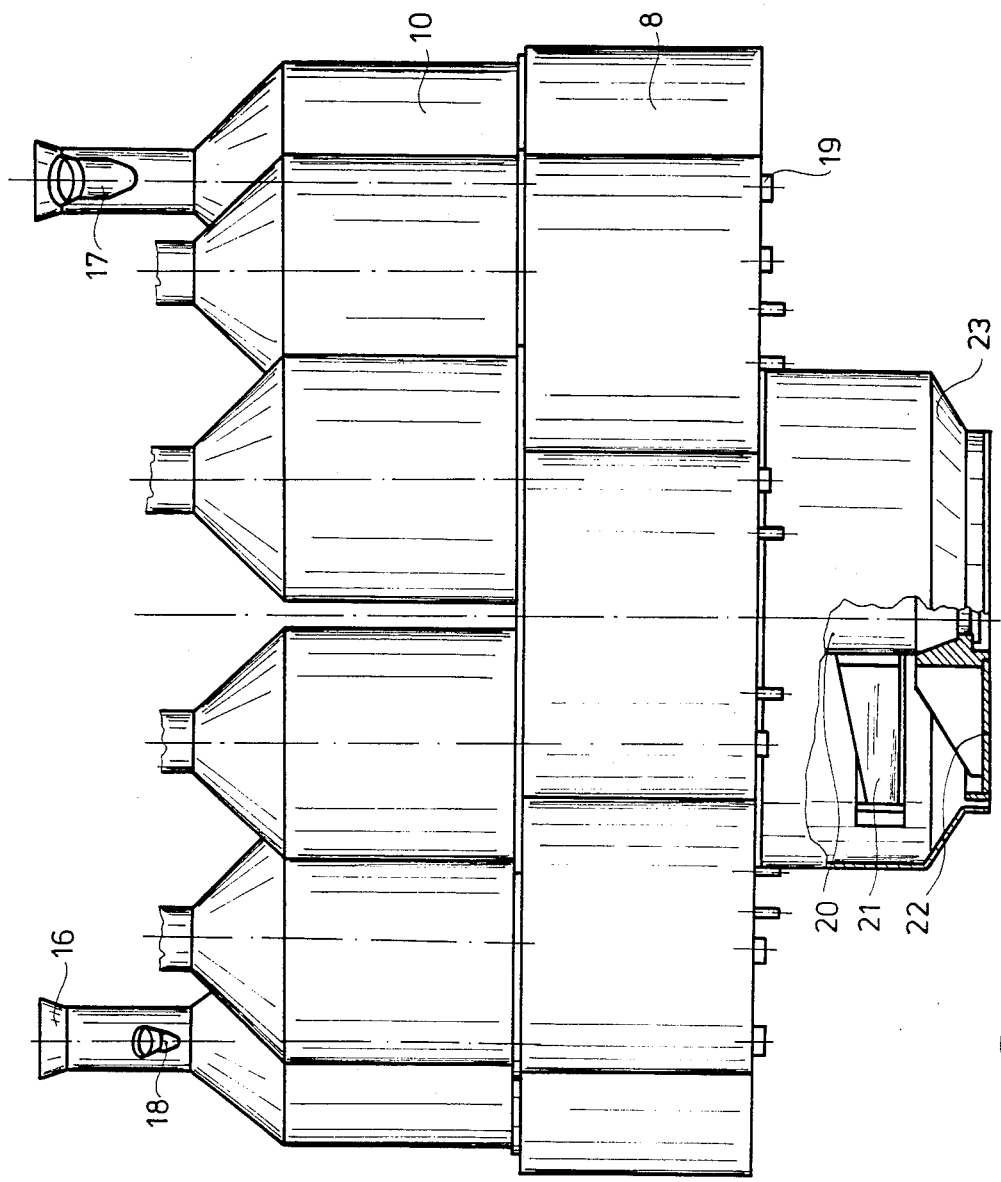
Figure 4:
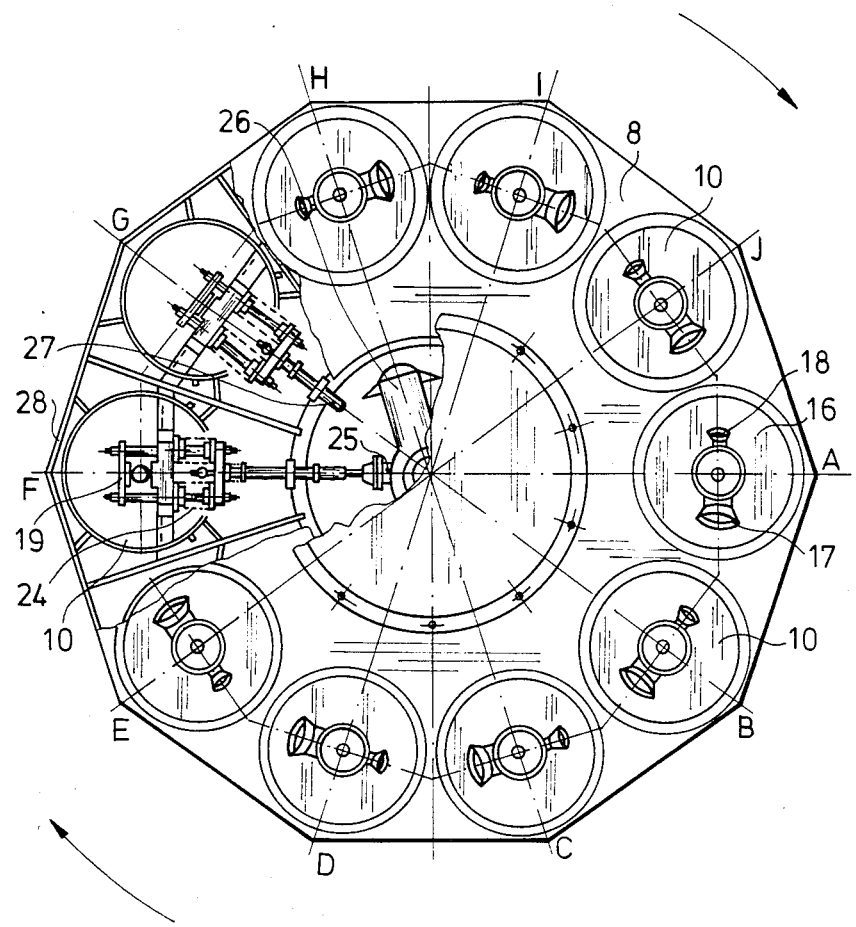
Figure 5:
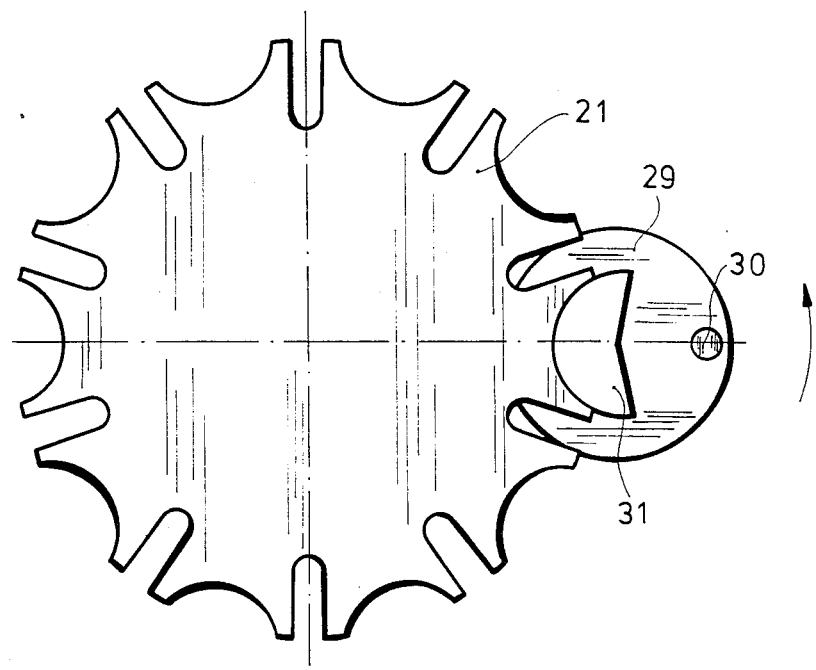
Figure 6:
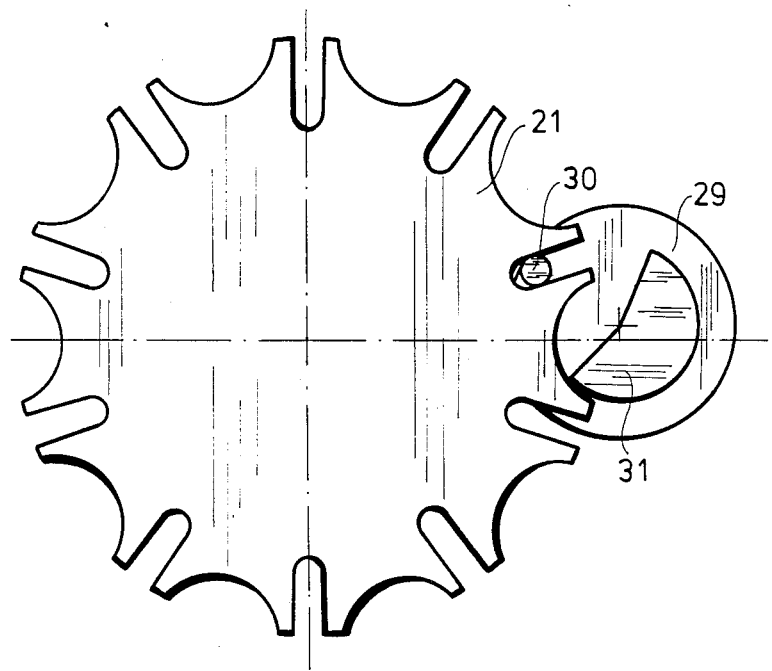
Figure 7:
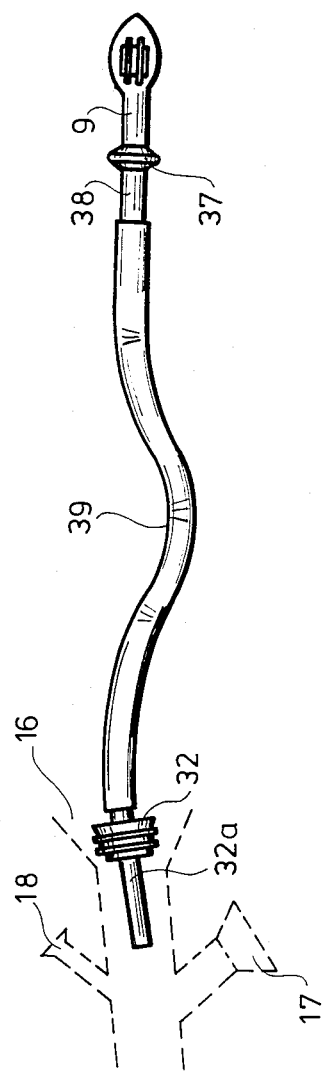
Figure 8:
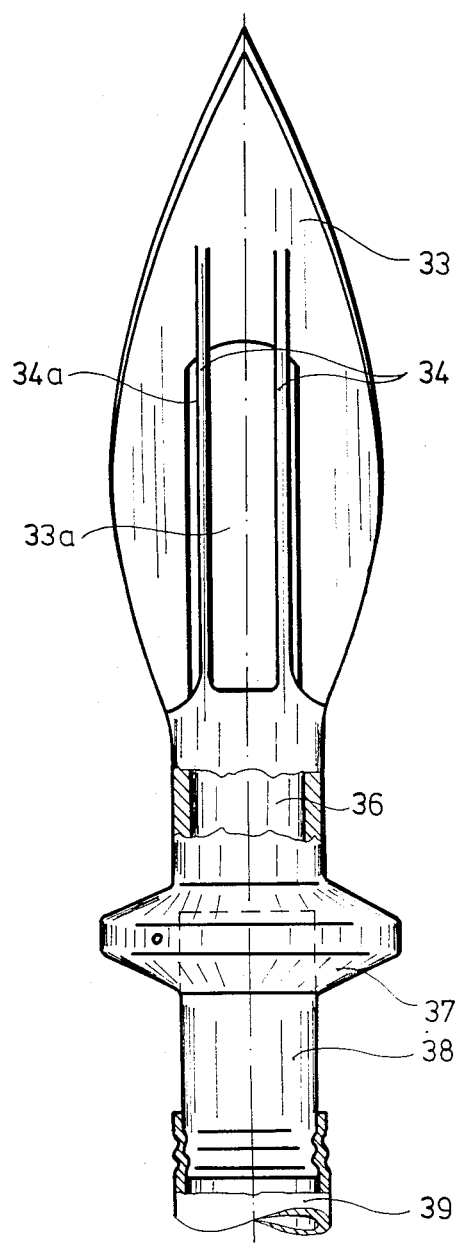
Figure 9:
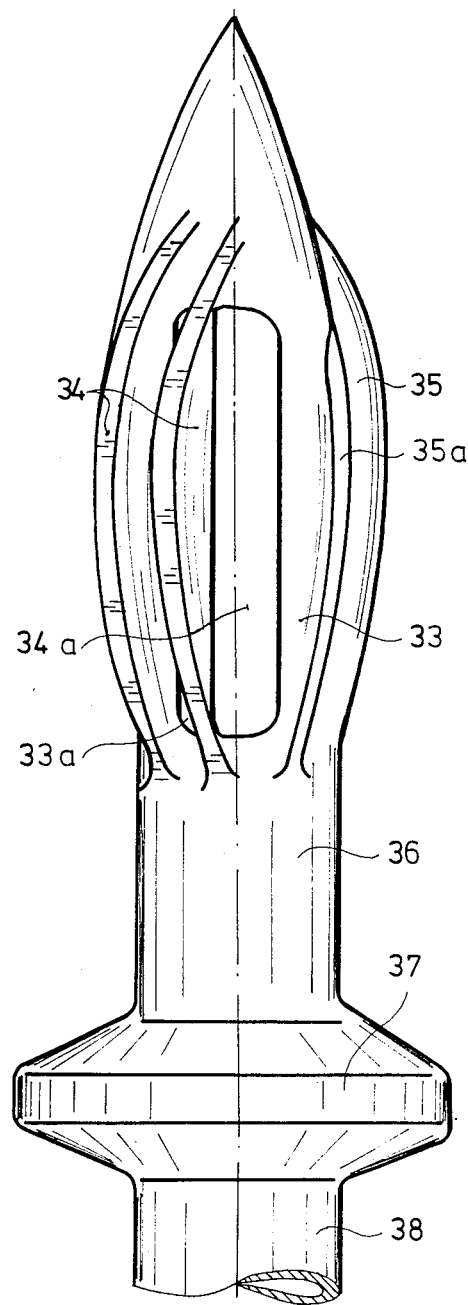
Figure 10:
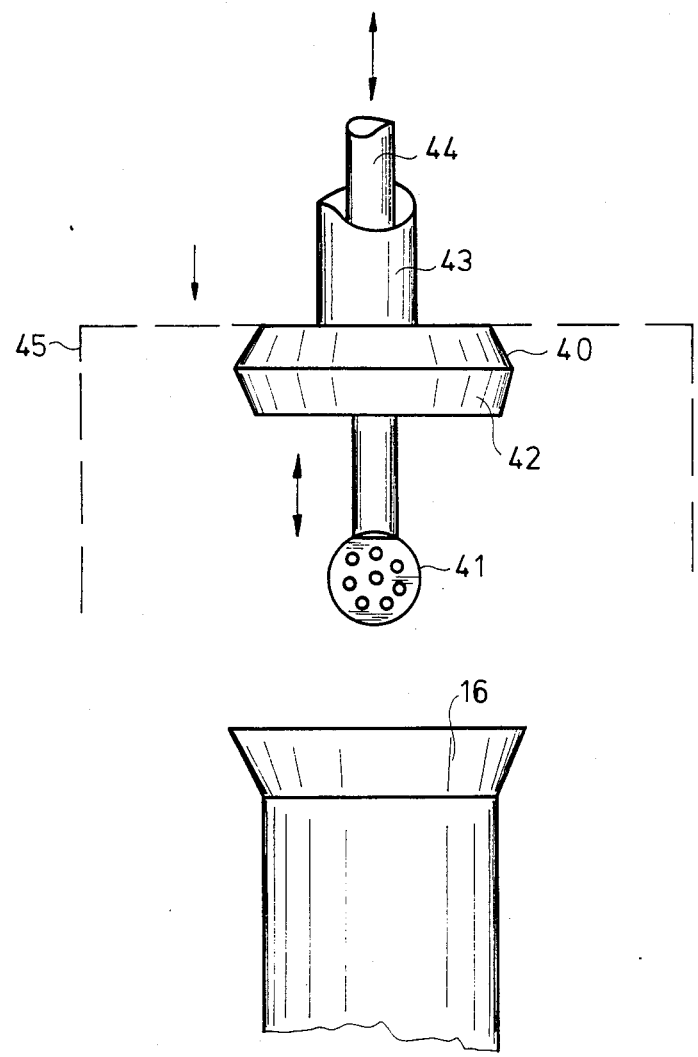
Figure 11:
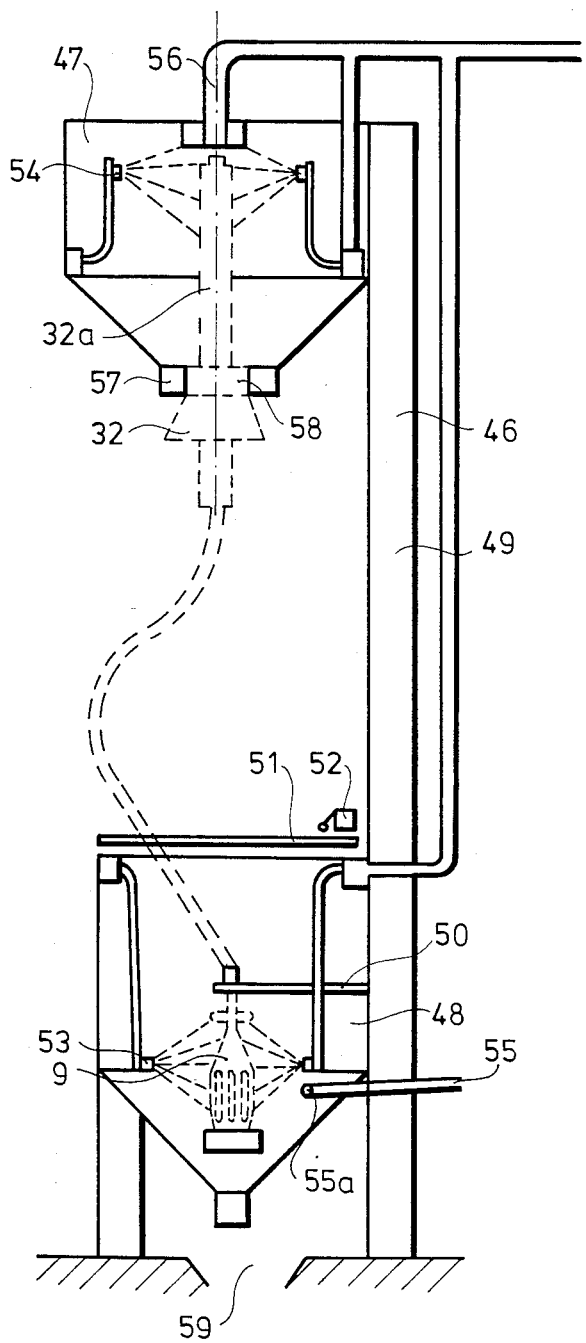

FIG. 2 is a layout of the pig slaughterline incorporating the blood extracting and collecting apparatus according to the invention, FIG. 3 is a side view of the turntable, partly in section, FIG. 4 is a top view of the turntable, partly in section, FIG. 5 is a top view of the Geneva gear for the intermittent rotation of the turntable, in locked position, FIG. 6 is a top view of the Geneva gear according to FIG. 5 during rotation, FIG. 7 is a front view of the hose-fitted hollow knife, FIG. 8 is a front view of the stabbing part of the hollow knife and its grip, partly in section, FIG. 9 is an axonometric view of the hollow knife, FIG. 10 is a fron view of the washing unit of the blood collecting tanks and FIG. 11 is a vertical section of the washing apparatus for the hollow knife.

The progress of the pigs on the slaughterline is shown in FIG. 2 by an arrow marked with dot-dash line. FIG. 2 shows a conventional stunning box 1, a strapping table 2, a slanting elevator 3, a waiting feeder 4, and a stabbing position 5 in the process of the pig slaughtering technology.

The blood extracting and collecting apparatus according to the invention branches off at the stabbing position 5, while a feeder 6 forwards the carcasses drained from blood onto an after-bleeding conveyor 7. Thereafter the carcass drained from blood passes through the machine units—not shown in FIG. 2—which realize the technological operations to the control body q examining the hygienic condition of the meat and blood of the slaughtered pigs.

FIG. 2 shows schematically a hose-fitted hollow knife 9 used for blood extraction to be changed for each animal in order to preserve the sterile condition, a turntable 8, ten pieces of blood collecting tanks 10 uniformly spaced along the periphery of the turntable 8, a heat insulated pipe 11 carrying the blood fit for consumption, by means of a pump 11a to a separator tank 11b, a pipe 12 carrying the blood unfit for consumption by means of a pump 12a to a collecting tank 12b, a vacuum pump 13 facilitating the blood extraction through the vacuum tube 13a into the tanks 10, a central control unit 14, a board 15 indicating the serial number of the pig next in line in the stabbing position 5.

The blood extracting and collecting apparatus according to FIG. 2 ensures the passage of the blood fit for consumption from the hollow knife 9 stabbed into the throat of the pig to the separator tank 11b, preferably in a closed system, under sterile conditions, and it safely separates the blood unfit for consumption from the extracted blood and directs it into the collecting tank 12b.

FIGS. 3 and 4 show the construction of the intermittently rotating turntable 8 and that of the ten blood collecting tanks 10 arranged on the turntable. The vertical cylindrical tanks 10 are conical on the top and bottom and are made suitably of acid-resistant stainless steel, which resist the external pressure arising during the internal vacuum. The internal and external surfaces of the tanks 10 are completely smooth and polished.

A plug 32 of a hose 39 of the hollow knife 9 is attached with a pipe stub 32a to a tubular mouthpiece 16 arranged on the top of the tanks 10, through which the blood flows from the wound of the pig through the hollow knife 9 and the hose 39 into the tanks 10. A coupling 17—to which the vacuum tube 13a is quickly and easily connectible with a releasable joint and the coupling 18 for the anticoagulant similarly simply and releasably interconnected with an hose 18a are fitted to the mouth-piece 16.

The vacuum accelerates the outflow of the blood from the carcass, it assists the admission of the anticoagulant since it sucks the flesh of the animal onto the hollow knife 9 stabbed into the throat right to the flange 37 and thus the flexible animal flesh adhering to the hollow knife 9 hermetically sealed from the external space ensures the flow of the blood through the sterile hollow knife 9 and the hose 39 (FIGS. 7 and 8) into the disinfected tank 10.

For draining of the blood in compliance with the hygienic requirements and for draining of the washing liquid a cock 19 is fitted to the lower conical part of the tank 10 consisting of a hose pressed together in normal position by two cylindrical springs 24 in such a way that the blood or washing liquid can not be drained from the tank 10 until the hose cock 19 is opened upon pressing of pin 27 by the intervention device such as pneumatic cylinder 25 or control unit 26 through compression of the springs 24 against the spring force.

The turntable 8 provided with a cover 23, made suitably of stainless steel and hermetically sealing the interior, is intermittently rotated around a vertical shaft 20 by a stepping mechanism, e.g. Geneva gear 21 mounted on a shaft 20 and a base plate 22 (FIGS. 5 and 6). Since ten pieces of tanks 10 spaced at uniform distance from each other are fixed onto the frame 28 of the turntable 8, thus the turntable 8 and the tanks 10 rotate cyclically along a circular orbit, each step corresponding to an angular displacement of 36°.

The control system of the apparatus, the requirements of blood extraction and identification as well as the regulation of the collecting, draining and washing units require stepping performed by the conventional ten-position Geneva gear 21 shown in FIGS. 5 and 6. The Geneva gear 21 is actuated by a pneumatic cylinder 10 with two limit switches (not shown) through a driving wheel 29 provided with a pivot 30. Upon complete turn of 360° of the driving wheel 29 the Geneva gear 21 turns at an angle of 36° corresponding to one step. The Geneva gear 21 is fixed by an adapter 31 of the driving wheel in its stationary position.

FIGS. 2 and 4 show that—according to the example—during its stepping each tank 10 rotating with the turntable 8 turns into the ten positions marked with the letters A–J. The blood obtained from the animal through the hose 39 fitted to the hollow knife 9 is admitted in the blood extracting position A into the previously washed and disinfected blood collecting tank 10. The time elapsed during the residence of tanks 10 containing the blood in the waiting positions B–E equals the time during which the ten pigs giving blood into each tank 10 arrive from the stabbing position 5 at the animal hygienic control body q. In the draining position F of the blood fit for consumption—depending on the instruction of the control body q—the intervention device 30 i.e. the pneumatic cylinder 25 drains the blood through the hose cock 19, or leaving the blood within it keeps the tank 10 closed. In the draining position H of the blood unfit for consumption following the waiting position G the control unit 26 that may be a pneumatic cylinder, or a device provided with a cam according to the example, opens the hose cock 19 by means of the pin 27. Following the washing and disinfecting position I the control unit 26 (pneumatic cylinder or control device with cam) keeps the hose cock 19 open in the dripping position J. The hoses of the hollow knife, vacuum and anticuagulant are connected to the tank 10 in this position J.

Upon completion of the cycle that is of 360° turn of the turntable, the next tank 10 with the hose cock 19 closed, washed and disinfected steps into the blood extraction position A and filling of the next tank 10 with blood followed by the already described rotation will commence.

The pneumatic cylinder 25 locked with the limit switches and the control unit 26 are fixed to the vertical shaft 20.

FIG. 7 shows the hollow knife 9 provided with a hose 39, at least two pieces of which are necessary in order to replace them for each animal and for the alternating washing and disinfection. The hollow knife 9 is interconnected with the hose 39 by a tubular grip 38. The hose 39 is attached with the plug 32 to the mouthpiece 16 of the tank 10, into which an inlet pipe stub 32a fitted to the plug 32 is led that is made of soft rubber-suitable for food industrial purpose.

FIGS. 8 and 9 show the hollow knife 9, the stabbing part of which is a single piece made of stainless steel. The stabbing part includes a flat blade 33, longitudinal upper ribs 34 and lower ribs 35 formed on and perpendicular to the blade, a longitudinal orifice 33a ending in an arc towards the point of the blade and formed around the middle part of the flat blade 33, and the longitudinal orifices 34a—shown only in part—formed on the ribs 34, 35. The ribbed flat blade 33 continues in a lower tube-part 36 surrounded by a lower flange 37. The tube extension of the grip 38 joins the lower tube part 36 to which the hose 39 made preferably of transparent synthetic material is fitted suitably with bayonet lock ensuring instant exchange.

FIG. 10 shows the drained tanks 10 and the tank washing unit 40 in the position I.

The tank washing unit 40 for the tanks is arranged above the washing position I of the turntable 8 suspended suitably by conventional (not shown) releasable joints.

The parts of the tank washing unit 40 are: a spherical washing head 41 provided with holes and its actuating devices, pneumatic cylinders 43, 44 controlled with conventional limit switches. One of them, the pneumatic cylinder 43 leads the washing head 41 into the tank 10 through the mouthpiece 16 with the aid of the conical inserting element 42, the other one, the pneumatic cylinder 44 alternately actuates the washing head 41 in vertical direction and is fastened suitably to the piston rod of the pneumatic cylinder 43. The washing head 41 is fitted to the end of the pneumatic cylinder 44.

According to a preferred embodiment instead of two pneumatic cylinders 43, 44 one pneumatic cylinder is used to introduce the washing head 41 into the tank 10 and to actuate the alternating motion of the washing head 41 in vertical direction.

A flexible hose—not shown—is used for the admission of the air and the washing liquid into the tank washing unit 40. A cap 45 gives protection against the splashing of the water.

The external part of the tank washing unit 40 is provided suitably with stainless steel cover, the internal parts are made preferably of stainless steel or suitable synthetic material.

FIG. 11 shows the washing and disinfecting apparatus 46 used for the hose-fitted hollow knife 9. Minimum two such apparatusses are necessary for the apparatus according to the invention for the continuous washing and disinfection of the two sterile and exchangeable hollow knives 9.

The upper tub 47 and lower tub 48 of the hollow knife washing apparatus 46 are supported by a stand 49. The stabbing part of the hollow knife 9 is fixed by a clamping frame 50 in the lower tub 48, while the plug 32 on the other end of the hollow knife 9 leading with the pipe stub 32a through an inlet orifice 58 of the upper tub 47 is connected to a plug clamping element 57.

The closing of the tilting cover 51 of the lower tub 48 sensed by a limit switch 42 starts the washing programme. The washing programme is controlled by a conventional control unit 14 and the completion of the washing programme is indicated by a not shown signal lamp.

The hose-fitted hollow knife 9 is removed upon completion of the washing programme following the opening of the tilting cover 51.

The hollow knife washing apparatus 46 carries out the cleaning, disinfection of the hollow knife 9 with steam under low pressure following the flushing with water. The water is admitted into the upper tub 47 through the nozzles 54, and into the lower tub 48 through the nozzles 53. The liquid cleaning the outside of the hollow knife 9 flows into the apparatus through the nozzles 54 of the upper tub 47, and the nozzles 53 of the lower tub 48, while the liquid cleaning the interior flows in through an inlet pipe 56.

The hollow knife 9 is disinfected with steam through a nozzle 55a on the inlet part 55.

The washing liquid is drained into the sewage system through a water draining funnel 59.

The knife washing apparatus 46 is made suitably of acid-resistant stainless steel. The apparatus is fixed to the floor preferably with releasable joint.

The operation of the apparatus used for blood extraction of the pigs according to the invention is the following:

The ear of the first blood giving pig is marked with a four-digit number in the waiting feeder 4 on the 100 pc/h capacity pig slaughterline provided with a conventional control system (FIG. 2). The first two digits of the four-digit number indicate the number of turns of the turntable 8, the third digit indicates the number of the tank 10 containing the blood and the fourth digit indicates the number of the marked animal in the group of ten numbered from 0 to 9. This serial number is indicated also by the sign board 15 in the stabbing position 5.

Following the disinfection of the stabbing spot on the throat of the animal, the pig is forwarded to the stabbing position 5, where it is received by the turntable 8 carrying the ten tanks 10 according to the example, i.e. by the next blood collecting empty tank 10 previously washed and disinfected in the blood extraction position. The pipe stub 32a of the hose-fitted hollow knife 9 is connected to the mouthpiece 16 of the aforementioned tank 10, the vacuum tube 13a to the coupling 17 and the hose 18a for the anticoagulant is attached to the coupling 18.

After thrusting the stabbing part of the hollow knife 9 right to the lower flange 37, the vacuum effect extending to the stabbing part sucks the animal flesh surrounding the stabbing part onto the hollow knife 9 hermetically sealing off the external space, and it accelerates the flow of the blood (absorption of the blood) into the tank 10. Following the blood extraction, the hollow knife 9 is removed from the wound—suitably upon sound or light signal—the plug 32 of the hollow knife 9 is released from the mouthpiece 16 and the inlet pipe stub 32a and the other hose-fitted hollow knife 9 (plug 32 and pipe stub 32a) are attached to the mouthpiece 16 of tank 10. Meanwhile a pig marked with the next serial number and disinfected on its throat arrives from the waiting feeder 4 at the position of the pig drained from blood and stepped forward by feeder 6 of the afterbleeding conveyor 7, from which the blood extraction takes place as described before.

Following the draining of the blood into the tank 10 in the blood extracting position A, the plug 32 of the hollow knife 9, the inlet pipe stub 32a, the vacuum tube 13a and the hose 18a are removed from the tank 10 filled with blood, and upon sound or light signal the turntable 8 is stepped forward at an angular displacement of 36° according to the example in clockwise direction with the aid of the mechanism operating with the Geneva gear 21. This way the tank 10 filled with blood passes from the blood extracting position A into the waiting position 8, while the next empty disinfected tank 10 steps into the blood extracting position A which is filled with the blood of the successive ten pigs as described before.

The tanks 10 filled with blood are stepped forward at an angular displacement of 36° by the turntable 8 according to the cycle corresponding to the time of the blood extraction. The tanks 10 filled with blood are waiting in the waiting positions B–E until each of the ten carcasses drained from blood into the tanks 10 arrive at the animal hygienic control body q, where the serial number of these pigs appear on the sign board and at the same time these pigs are examined by the control body q in respect of fitness for consumption. The ten tanks 10 containing the blood of the ten pigs stand in the draining position F of the blood fit for consumption at the time of completing the health examination of the blood of the ten carcasses drained into each tank 10. If after identification of the carcasses and their blood in tanks 10—based on the serial number appearing on the sign board at the control body q—the ten carcasses are found to be hygienically fit by the control body and thereby the blood in the ten tanks standing in position F are qualified as suitable for consumption, the control body gives instruction through the central control unit 14 to the intervention device controlling the hose cock 19, i.e. to the pneumatic cylinder 25 for opening of the hose cock 19 and for draining of the blood contained in tank 10 through the heat insulated pipe 11 into the system storing the blood fit for consumption. The pneumatic cylinder 25 locks the hose cock 19 after draining of the tank 10. Thus the blood fit for consumption passes from the carcass through a heat insulated pipe 11 at high temperature of 32°–34° C., in a closed system, under completely sterile conditions into the separator tank 11b. At such high temperature the blood fit for consumption can be more easily separated to the blood plasma and thick blood, than the blood cooled before separation.

If any of the ten carcasses is qualified by the control body q as doubful or to be confiscated, or one or several of the carcasses are missing, the control body q prohibits the opening of the hose cock 19 by the pneumatic cylinder 25 and the blood in the tank 10 as unfit for consumption is stepped into the waiting position G, then into the draining position H, where the control unit 26—independently from the tank being full or empty—opens the hose cock 19. If blood is in tank the 10 it flows through the cock 19 and the pipe 12 with the aid of the pump 12a into the collecting tank 12b. Thus the blood unfit for consumption is collected in the collecting tank 12b.

The conical inserting element 42 of the tank washing unit 40 suspended above tank 10 in position I is fitted by the pneumatic cylinder 43 onto the mouthpiece 16 of tank 10. The pneumatic cylinder 44 fixed to the piston rod of the pneumatic cylinder 43 moving alternately up and down the spherical washing head 41 in the tank 10 washes and disinfects the tank 10. In position J the washing liquid passes out of the tank 10 through the hose cock 19, and when the plug 32 and the inlet pipe stub 32a of the hollow knife 9, furthermore the vacuum tube 13a and the hose 18a are fitted to the mouthpiece 16 and to the couplings 17 and 18, the empty disinfected tank 10 is ready for stepping forward into the blood extracting position A and for the hygienic filling with blood as described earlier.

After extraction of the blood from each pig the hollow knife 9 is placed into the knife washing apparatus 46 which washes and disinfects the hollow knife 9 inside-outside as described earlier. The construction and operation of the apparatus according to the invention used for the hygienic extraction and collection of the cattle blood differs from the apparatus used for extraction and collection of the pig blood in that the blood of three cattles is drained into each tank 10 and the four waiting positions after the blood extracting position A are increased to five. Thus eleven tanks 10 are arranged on the turntable 8, which has eleven positions during one cycle. Otherwise the apparatus, the hose-fitted hollow knife, the tank-washing unit and the knife washing apparatus are similar to the construction shown in the Figures and the measures are also similar to those which ensure the observance of the hygienic requirements in the process of blood extraction and collection.

The apparatus according to the invention used for the extraction and collection of the sheep blood is the same as the one used for the extraction and collection of the pig blood.

We claim:

1. An apparatus for the hygienic extraction and separate collection of animal blood which is fit and unfit for consumption, comprising: an intermittently rotatable turntable for moving tanks into an extracting position, first and second draining positions and a washing position; numbering means for identifying each carcass and its blood; a hollow knife with a ribbed stabbing part made of a single piece; a plurality of tanks uniformly spaced along its periphery of the turntable with each having a hose cock on a lower part for draining and couplings on an upper part for the input of blood, a vacuum and an anticoagulant; a hose connecting the knife to the coupling of a tank on the extracting position; a storage system for blood fit for consumption connectable to the hose cock on the bottom of a tank in the first draining position on the turntable; a collecting system for blood unfit for consumption connectable to the hose cock on the bottom of a tank in the second draining position; a tank-washing unit arranged above a tank in the washing position; a knife washing apparatus for washing and disinfecting the hollow knife and hose; and an animal hygienic control body for opening the hose cock of a tank of the first draining position if the numbered carcasses corresponding to the blood in the tank are healthy.

2. The apparatus according to claim 1, wherein the stabbing part made of a single piece comprises a flat blade with longitudinal ribs perpendicular to the blade and with longitudinal holes, a lower tubular part and a surrounding flange, a pipe extension releasably fitted to the lower tubular part, with the hose releasably connected to the pipe extension and an inlet pipe stub with a plug on the end of the hose.

3. The apparatus according to claim 1, wherein the tank washing unit comprises a spherical washing head with holes, a mechanism for the alternating movement of the washing head in the vertical direction, a pneumatic cylinder fitting a conical insert onto a mouthpiece of a tank and limit switches for controlling the mechanism and pneumatic cylinder.

4. The apparatus according to claim 2, wherein the knife washing apparatus comprises an upper tub and a lower tub fixed to a stand and provided with nozzles for introducing liquid for washing and disinfection, the upper tub has a pipe stub for admission of the disinfectant fitted to an element clamping the plug of the hollow knife used for the internal disinfection of the hose-fitted hollow knife, and nozzles to admit the liquid for the external disinfection of the hollow knife, the lower tub has a tilting cover with limit switches for the automatic control of washing, a frame for clamping the stabbing part of the hollow knife and a water draining funnel with a pipe stub for draining of the liquid.

5. A process for the hygienic extraction and separate collection of animal blood which is fit and unfit for consumption based on the health of the animals, comprising: stunning animals prior to stabbing; providing the animals with serial numbers suitable for identification of the carcass and the blood to be extracted therefrom; disinfecting the spot of stabbing on the throat of the animals; cyclically stepping the animals into a stabbing position; stabbing the animals in the stabbing position with a disinfected stabbing tool which is exchanged for each animal and is provided with a closed outlet hose-fitted hollow knife; extracting the hygienic blood through the stabbing tool and into one of a plurality of blood collecting tanks arranged on a rotating turntable and moved into an extracting position; adding an anticoagulant to the blood by gravity feed; after filling each tank, advancing the tanks forward into a first draining position for blood fit for consumption; checking if all the numbered carcasses pertinent to the blood in the tank in the first draining position are healthy from the point of view of an animal health examination; if healthy, effecting the draining of the blood from the collecting tank into a system for blood fit for consumption by means of a control body; if not healthy, advancing the tank with the blood in it forward to a second draining position and draining the blood into a system for blood unfit for consumption; washing and disinfecting the drained tanks; and advancing the disinfected empty tanks into the extracting position.

6. A process as claimed in claim 5, further comprising moving the tanks into at least four waiting positions after the extracting position and before the first draining position.

7. A process as claimed in claim 5, further comprising washing and disinfecting all apparatuses associated with the blood extraction and collection for each new blood extraction.

8. A process as claimed in claim 5, wherein the step of checking comprises identifying on the basis of the serial numbers, which carcasses the blood in the tank in the first draining position is extracted from and effecting the draining into the system of the blood fit for consumption after examining all animals giving blood into this tank and finding that the animals are healthy.

* * * * *